US006430557B1

(12) United States Patent
Gaussier et al.

(10) Patent No.: US 6,430,557 B1
(45) Date of Patent: Aug. 6, 2002

(54) IDENTIFYING A GROUP OF WORDS USING MODIFIED QUERY WORDS OBTAINED FROM SUCCESSIVE SUFFIX RELATIONSHIPS

(75) Inventors: Eric Gaussier, Grenoble; Gregory Grefenstette, Gieres; Jean-Pierre Chanod, Grenoble, all of (FR)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/212,662

(22) Filed: Dec. 16, 1998

(51) Int. Cl.[7] .......................... G06F 17/30; G06F 17/27; G06F 17/21

(52) U.S. Cl. ...................... 707/5; 707/6; 704/9; 704/10

(58) Field of Search ...................... 707/1–7; 704/1–10, 704/205

(56) References Cited

U.S. PATENT DOCUMENTS

| 4,799,188 | A |   | 1/1989  | Yoshimura ................. 364/900 |
| 4,864,501 | A |   | 9/1989  | Kucera et al. ............. 364/419 |
| 5,488,725 | A | * | 1/1996  | Turtle et al. ................. 707/5 |
| 5,551,049 | A |   | 8/1996  | Kaplan et al. ............. 395/800 |
| 5,594,641 | A |   | 1/1997  | Kaplan et al. ............. 395/601 |
| 5,625,554 | A |   | 4/1997  | Cutting et al. ............. 707/100 |
| 5,696,962 | A | * | 12/1997 | Kupiec ......................... 707/4 |
| 5,940,624 | A | * | 8/1999  | Kadashevich et al. ......... 704/9 |
| 5,963,940 | A | * | 10/1999 | Liddy et al. ................. 707/5 |
| 6,012,053 | A | * | 1/2000  | Pant et al. ..................... 707/3 |
| 6,081,774 | A | * | 6/2000  | de Hita et al. ................ 704/9 |
| 6,092,065 | A | * | 7/2000  | Floratos et al. .............. 707/6 |
| 6,101,492 | A | * | 8/2000  | Jacquemin et al. ........... 707/3 |
| 6,105,023 | A | * | 8/2000  | Callan ......................... 707/5 |
| 6,308,149 | B1 | * | 10/2001 | Gaussier et al. .............. 704/9 |

OTHER PUBLICATIONS

Adamson, George W. et al. "The Use of an Association Measure Based on Character Structure to Identify Semantically Related Pairs of Words and Document Titles," Inform. Stor. Retr. vol. 10, 1974, pp. 253–260.

Chanod, Jean–Pierre et al. "Taging French–Comparing a Statistical and a Constraint–Based Method," Rank Xerox Research Centre, pp. 149–156.

Dawson, J.L. "Suffix Remvoal and Word Conflation," ALLC Bulletin, 1974, pp. 33–46.

Frakes, W.B. "Stemming Algorithms," Information Retrieval Data Structures & Algorithms, Prentice Hall, New Jersey, 1992, pp. 131–160.

Frakes, W.B. "Term Conflation for Information Retrieval," Research and Development in Information Retrieval Proceedings of the Third Joint BCS and ACM Symposium, King's College, Cambridge, Jul. 2–6, 1984, pp. 383–389.

Hafer, Margaret A. et al. "Word Segmentation by Letter Successor Varieties," Inform. Stor, Retr. vol. 10, pp. 371–385.

(List continued on next page.)

Primary Examiner—James P. Trammell
Assistant Examiner—Mary Wang
(74) Attorney, Agent, or Firm—Oliff & Berridge, PLC (57) ABSTRACT

A query word is used to identify one of a number of word groups, by first determining whether the query word is in any of the word groups. If not, attempts to modify the query word are made in accordance with successive suffix relationships in a sequence until a modified query word is obtained that is in one of the word groups. The sequence of suffix relationships, which can be pairwise relationships, can be defined by a list ordered according to the frequencies of occurrence of the suffix relationships in a natural language. If a modified query word is obtained that is in one of the word groups, information identifying the word group can be provided, such as a representative of the group or a list of words in the group.

20 Claims, 6 Drawing Sheets

OTHER PUBLICATIONS

Harman, Donna "How Effective Is Suffixing?" Journal of the American Society for Information Science, Jan. 1991, vol. 42, No. 1, pp. 7–15.

Hull, David A. "Stemming Algorithms: A Case Study for Detailed Evaluation," Journal of the American Society for Information Science, Jan. 1996, vol. 47, No. 1, pp. 70–84.

Jacquemin, Christian "Guessing Morphology from Terms and Corpora," Proceedings of the 20$^{th}$ Annual International ACM SIGIR Conference on Research and Development in Information Retrieval, Philadelphia, Pennsylvania, Jul. 27–31, 1997, pp. 156–165.

Karttunen, Lauri et al. "A Compiler for Two–Level Phonological Rules," Jun. 25, 1987.

Karttunen, Lauri "Constructing Lexical Transducers," Proceedings of the 15$^{th}$ International Conference on Computational Linguistics, Kyoto, Japan, Aug. 5–9, 1994, pp. 406–411.

Karttunen, Lauri "The Replace Operator," Proceedings of 33$^{rd}$ Annual Meeting of the Association for Computational Linguistics, ACL–94, Boston, Massachusetts, 1995, pp. 16–23.

Kaplan, Ronald M. et al. "Regular Models of Phonological Rule Systems,"Computational Linguistics vol. 20, No. 3, 1994, pp. 331–380.

Lennon, Martin et al. "An Evaluation of Some Conflation Algorithms for Information Retrieval," Journal of Information Science 3, 1981, pp. 177–183.

Lovins, Julie Beth "Development of a Stemming Algorithm*,"Mechanical Translation and Computational Linguistics, vol. 11, 1968, pp. 22–31.

Paice, Chris D. "Another Stemmer," SIGIR Forum, Fall 1990, vol. 24, No. 3, pp. 56–61.

Paice, Chris D. "Method for Evaluation of Stemming Algorithms Based on Error Counting," Journal of the American Society for Information Science, vol. 47, No. 8, Aug. 1996, pp. 632–649.

Porter, M.F. "An Algorithm for Suffix Stripping," Program Automated Library and Information Systems, vol. 14, No. 3, Jul. 1980, pp. 130–137.

Rasmussen, Edie "Clustering Algorithms," pp. 419–436.

Roche, Emmanuel et al. "Deterministic Part–of–Speech Tagging with Finite–State Transducers," Computational Linguistics, vol. 21, No. 2, 1995, pp. 227–253.

Romesburg, H. Charles Cluster Analysis for Researchers, 1984, pp. 9–15.

Salton, Gerard et al. Introduction to Modern Information Retrieval, McGraw–Hill Book Company, 1983, pp. 130–136.

"Xerox Linguistic Database Reference English Version 1.1.4," Xerox Corporation, 1994.

* cited by examiner

IDENTIFYING A GROUP OF WORDS USING MODIFIED QUERY WORDS OBTAINED FROM SUCCESSIVE SUFFIX RELATIONSHIPS

FIELD OF THE INVENTION

The invention relates to identifying one of a number of groups of words.

BACKGROUND AND SUMMARY OF THE INVENTION

U.S. Pat. No. 5,551,049 discloses a technique in which information about one of a number of groups of words is determined by matching an identifier of a received word. The identifier is compared with word identifiers grouped in sequence to represent synonym groups. When a match is found, the group of identifiers that includes the matching identifier is used to obtain synonym group that includes the received word.

Frakes, W. B., "Stemming Algorithms", in Frakes, W. B., and Baeza-Yates, R., Eds., *Information Retrieval*, Prentice Hall, 1992, pp. 131–160, discloses a taxonomy for stemming algorithms that includes several automatic approaches. Affix removal algorithms remove suffixes and/or prefixes to obtain a stem, while table lookup methods perform lookup in a table in which terms and their corresponding stems are stored. Affix removal algorithms such as the Porter stemmer can, after removing characters according to a set of replacement rules, perform recoding, a context sensitive transformation, to change characters of the stem.

Hull, D. A., "Stemming Algorithms: A Case Study for Detailed Evaluation", *Journal of the American Society for Information Science*, Vol. 47, No. 1, 1996, pp. 70–84, discloses a lexical database that can analyze and generate inflectional and derivational morphology. The inflectional database reduces each surface word to a dictionary form, while the derivational database reduces surface forms to stems that relate to the original in both form and semantics. The databases are constructed using finite state transducers (FSTs), which allows the conflation process to act in reverse, generating all conceivable surface forms from a single base form.

Salton, G., and McGill, M. J., *Introduction to Modem Information Retrieval*, New York: McGraw-Hill, 1983, pp. 75–84 disclose information retrieval techniques that use a thesaurus. A thesaurus can be used, for example, in an automatic indexing environment, and when a document contains a term such as "superconductivity" or (stem "superconduct"), that term may be replaced by a class identifier for a class of words with related meanings. The same operation can be used for a user query containing a word in the class. Should the document contain "superconductivity" while the query term is "cryogenic", a term match would result through thesaurus transformation. Rather than replacing an initial term with the corresponding class identifier, the thesaurus class identifier can be added to the original term.

The invention addresses basic problems that arise in using a word, referred to herein as a "query word", to identify one of a number of groups of words. With conventional table lookup techniques, FST techniques, and other techniques that rely on matching the query word, an unknown query word will result in a failure. Affix algorithms like the Porter stemmer can stem any word, including an unknown query word, but conventional information retrieval techniques based on affix algorithms do not provide a fallback strategy if the first obtained stem does not relate the unknown word to any other word.

The invention is based on the discovery of a new technique for using a query word to identify one of a number of word groups. The technique first determines whether the query word is in any of the groups. If not, the technique attempts to modify the query word in accordance with successive suffix relationships in a sequence until it obtains a modified query word that is in one of the groups. The new technique in effect provides two stages of word group lookup—the first stage can be implemented by rapidly comparing a query word with the words in the groups, while the second stage is slower, because it includes attempting to obtain modified query words in accordance with suffix relationships.

The new technique can be implemented with an ordered list defining the sequence of suffix relationships, such as pairwise relationships. An attempt can be made to modify the query word in accordance with each relationship in the list until a modified query word is obtained that is in one of the groups. The relationships in the list can be ordered in accordance with their frequency of occurrence in a natural language, and modifications can be attempted beginning with the highest frequency suffix relationship. The ordered list can be automatically obtained as part of an automatic technique for producing the word groups.

The new technique can be implemented to attempt modifications of the query word iteratively, with each iteration attempting to modify the query word in accordance with a respective suffix relationship. If an iteration obtains a modified query word, it also determines whether the modified query word is in any of the word groups.

When a modified query word is obtained that is in one of the word groups, information identifying the word group can be provided, such as a representative of the group or a list of words in the group.

The new technique can further be implemented in a system that includes a query word and a processor that determines whether the query word is in any of the word groups. If not, the processor attempts to modify the query word in accordance with successive suffix relationships in a sequence until a modified query word is obtained that is in one of the word groups. The system can also include stored word group data indicating the word groups, and the word group data can be an FST data structure. The system can also include stored suffix relationship sequence data indicating the sequence of suffix relationships.

The new technique can also be implemented in an article of manufacture for use in a system that includes a storage medium access device. The article can include a storage medium and instruction data stored by the storage medium. The system's processor, in executing the instructions indicated by the instruction data, determines whether the query word is in any of the word groups. If not, the processor attempts to modify the query word in accordance with successive suffix relationships in a sequence until a modified query word is obtained that is in one of the word groups.

The new technique can also be implemented in a method of operating a first machine to transfer data to a second over a network, with the transferred data including instruction data as described above.

The new technique is advantageous because it allows more robust word group identification than conventional techniques. In comparison with conventional word matching techniques, the new technique is advantageous because it allows the use of an unknown word or a word that does not exactly match, which can arise, for example, when a user provides a query word that is not in any of the word groups. In comparison with conventional affix removal techniques, the new technique can continue to obtain modified query words until it finds one that is in one of the word groups, so that it does not fail if the first modified query word is not in any of the word groups.

The new technique is also advantageous because it allows for fully automatic implementation. One fully automatic implementation automatically obtains an ordered list of suffix relationships in automatically producing a word group data structure.

The following description, the drawings, and the claims further set forth these and other aspects, objects, features, and advantages of the invention.

DETAILED DESCRIPTION OF THE INVENTION

A. Conceptual Framework

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values". For example, a binary item of data, also referred to as a "bit", has one of two values, interchangeably referred to as "1" and "0" or "ON" and "OFF" or "high" and "low".

The term "data" includes data existing in any physical form, and includes data that are transitory or are being stored or transmitted. For example, data could exist as electromagnetic or other transmitted signals or as signals stored in electronic, magnetic, or other form. "Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of diskettes storing a single body of data would together be a storage medium.

A "storage medium access device" is a device that includes circuitry that can access data on a data storage medium. Examples include drives for accessing magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processor" or "processor" is any component or system that can process data, and may include one or more central processing units or other processing components.

A processor performs an operation or a function "automatically" when it performs the operation or function independent of concurrent human intervention or control.

Any two components are "connected" when there is a combination of circuitry that can transfer signals from one of the components to the other. For example, two components are "connected" by any combination of connections between them that permits transfer of signals from one of the components to the other.

A "network" is a combination of circuitry through which a connection for transfer of data can be established between machines. An operation "establishes a connection over" a network if the connection does not exist before the operation begins and the operation causes the connection to exist.

A processor "accesses" an item of data in memory by any operation that retrieves or modifies the item or information within the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item.

An "instruction" is an item of data that a processor can use to determine its own operation. A "processor" executes a set of instructions when it uses the instructions to determine its operations.

A processor accesses a first item of data "with" a second item of data if the processor uses the second item of data in accessing the first, such as by using the second item to obtain a location of the first item of data or to obtain information from within the first item of data.

To "obtain" or "produce" an item of data is to perform any combination of operations that begins without the item of data and that results in the item of data. To obtain a first item of data "based on" a second item of data is to use the second item to obtain the first item.

An item of data "indicates" a thing, event, or characteristic when the item has a value that depends on the existence or occurrence of the thing, event, or characteristic can be obtained by operating on the item of data. An item of data "indicates" another value when the item's value is equal to or depends on the other value.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

A "natural language" is an identified system of symbols used for human expression and communication within a community, such as a country, region, or locality or an ethnic or occupational group, during a period of time. Some natural languages have a standard system that is considered correct, but the term "natural language" as used herein could apply to a dialect, vernacular, jargon, cant, argot, or patois, if identified as distinct due to differences such as pronunciation, grammar, or vocabulary.

A "natural language set" is a set of one or more natural languages.

"Character" means a discrete element that appears in a written, printed, or phonetically transcribed form of a natural language. Characters in the present day English language can thus include not only alphabetic and numeric elements, but also punctuation marks, diacritical marks, mathematical and logical symbols, and other elements used in written, printed, or phonetically transcribed English. More generally, characters can include, in addition to alphanumeric elements, phonetic, ideographic, or pictographic elements.

A "word" is a string of one or more elements, each of which is a character or a combination of characters, where the string is treated as a semantic unit in at least one natural language. A word "occurs" in each language in which it is treated as a semantic unit.

A "prefix" is a substring of characters occurring at the beginning of a word, and a "suffix" is a substring of characters occurring at the end of a word.

A suffix "follows" a substring in a word and the substring "precedes" the suffix if the last character of the substring immediately precedes the first character of the suffix.

A "relationship" between suffixes refers to the occurrence in a natural language set of a set of words that are related but that have different suffixes, which are thus "related suffixes". A "pairwise relationship" is a relationship between two suffixes. A relationship between suffixes "occurs" when a natural language set includes a set of related words, each of which has one of the suffixes. If a part of speech is also indicated for each suffix, the relationship only "occurs" if the related word that has a suffix also has the indicated part of speech.

Substrings that precede related suffixes in a set of different words are "equivalent" if the words are all related because of a relationship between the substrings. For example, it is conventional to make minor graphical changes in a substring that precedes a suffix during inflectional changes, such as by adding or deleting a diacritical mark or otherwise changing a character to indicate a change in pronunciation or by changing between a single character and a doubled character. Substrings that precede suffixes may also be equivalent because they are phonetic alterative, because of a historical relationship through which one developed from the other or both developed from a common ancestor, because they are cognates in two different languages, or because of any of various other relationships.

The "frequency of occurrence" of a suffix relationship in a set of words such as a natural language is the number of different subsets of words in the set that are related by the suffix relationship.

A set of suffixes "relates" a set of words if each of the words can be obtained from any other in the set by a process that includes removing one of the suffixes and adding another of the suffixes. The process may also include other modifications, such as to a substring preceding the suffix or to a prefix that precedes the substring, but if there are no such other modifications, a prefix that includes the substring "occurs" with each of the suffixes in the set to form the set of related words.

A set of words that all have the same suffix are "equivalent" if the substrings that precede the suffix in all the words are equivalent. Each word in the set is "an equivalent" of every other word in the set.

A "representative" of a group is an item of data that is unique to the group so that it can be used to represent the group. A representative may be one of the members of a group of items of data or it may be an item of data obtained in some other way.

When a group of words all have equivalent substrings preceding related suffixes, one representative of the group can be a "normalized form" that can be obtained by "normalizing" a word in the group. Normalization of a word can involve operations such as removing suffixes and making appropriate modifications in the substring preceding the suffix. Depending on how normalization is performed, the normalized form of a group of words may be a dictionary form, a stem, or another version of the substring that precedes the suffix of a word in the group. Once the normalized forms of words are known, of course, an appropriate data structure can be produced to provide a word's normalized form in response to the word. Because normalization may produce the dictionary form of a word, the normalized form is sometimes called a "lemma". But normalization can also be performed on a lemma to obtain a normalized form.

A word is "in" a group of words if the word itself, an equivalent of the word, or a normalized form of the word is in the group.

An operation "identifies" a word group if the operation obtains information that is unique to the word group, such as a representative or other unique identifier of the group or a list of words in the group.

A "query word" is simply a word that is used in an operation that identifies a group of words. A "modified query word" is a word obtained by modifying a query word.

To modify a query word "in accordance with a suffix relationship" is to remove one suffix in the relationship from the query word and replace it by another, possibly also changing the substring that precedes the suffix. To "attempt" to modify a query word is to perform an operation that, if successful, modifies the query word. For example, an attempt to modify a query word in accordance with a pairwise relationship could include following the pairwise relationship "in both directions", attempting to match it against both suffixes in the relationship and, upon matching one, removing it from the query word and replacing it with the other.

A finite state transducer (FST) is a data processing system having a finite number of states and transitions (or arcs), each transition originating in a state and leading to a state, and in which each transition has associated values on more than one level. As a result, an FST can respond to an input signal indicating a value on one of the levels by following a transition with a matching value on the level and by providing as output the transition's associated value at another level. A two-level transducer, for example, can be used to map between input and output strings, and if the values are character types, the input and output strings can be words.

A "finite state transducer data structure" or "FST data structure" is a data structure containing information sufficient to define the states and transitions of an FST.

B. General Features

Figure 1:
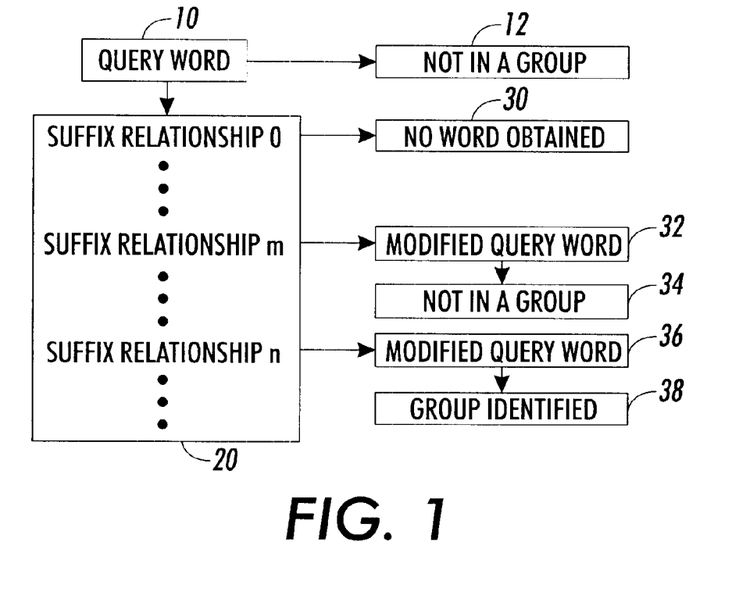
FIG. 1 is a schematic flow diagram showing how a query word can be used to identify a word group by attempting to obtain modified query words in accordance with successive suffix relationships in a sequence.
Figure 2:
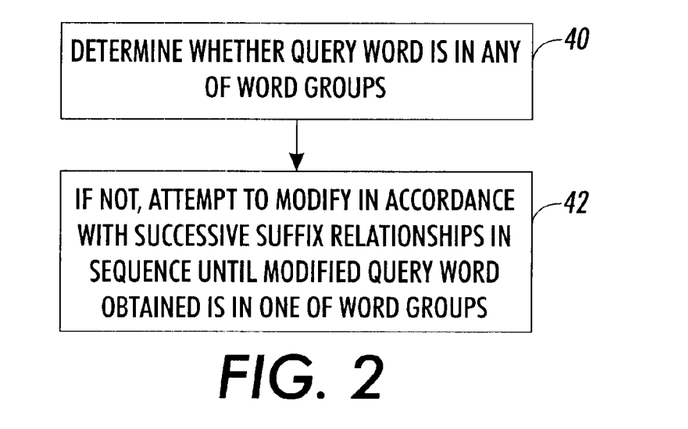
FIG. 2 is a flow chart showing general acts in identifying a word group by attempting to obtain modified query words.
Figure 3:
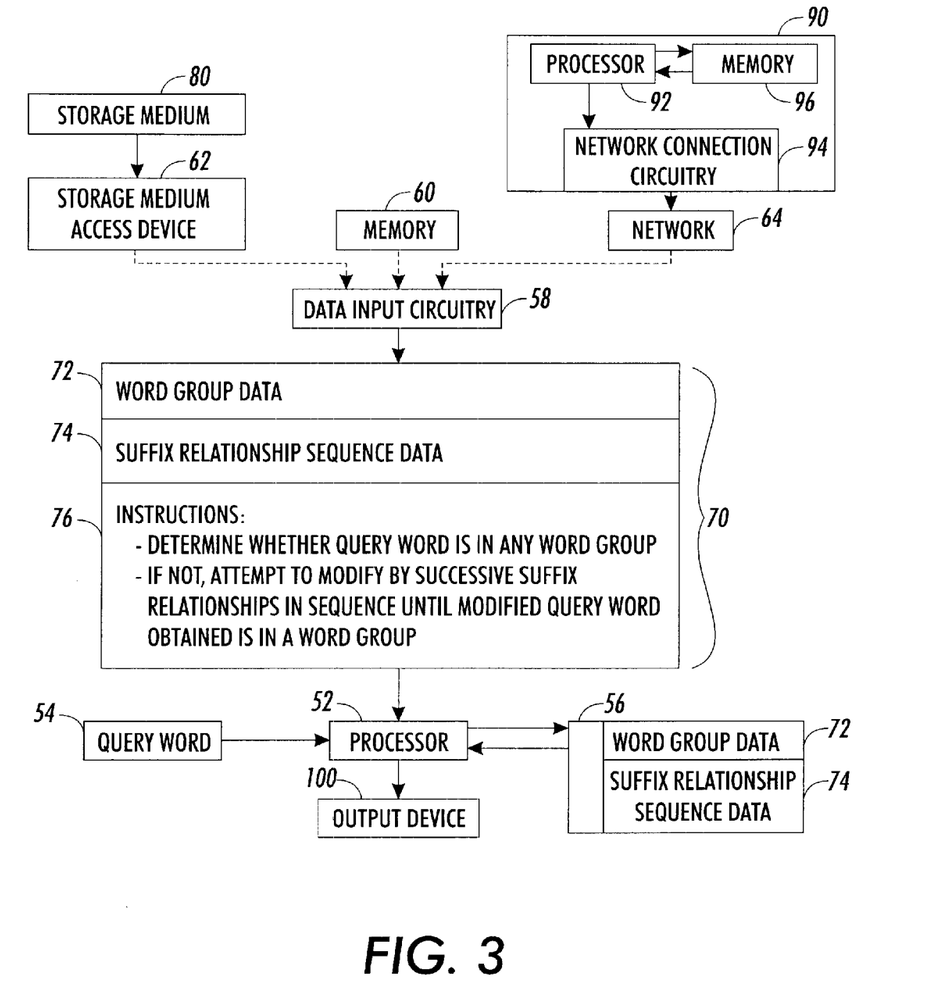
FIG. 3 is a schematic diagram showing components of a system that can perform the general acts in FIG. 2.

FIGS. 1–3 illustrate general features of the invention.

FIG. 1 is a flow diagram that shows schematically how successive attempts to modify a query word can be made in accordance with successive suffix relationships in a sequence until a modified query word is obtained that is in a group.

Query word 10 is not in any of a number of groups of words available to be identified, as shown in box 12. Nevertheless, query word 10 may be related to another word that is in one of the groups of words.

Sequence 20 includes a number of suffix relationships, several of which are illustratively shown. Successive attempts to modify query word 10 can be made in accordance with successive suffix relationships in sequence 20.

The result of attempting to modify query word 10 in accordance with suffix relationship 0 (and illustratively also each of suffix relationships 1 through m−1 and m+1 through n−1) is that no word is obtained, as shown in box 30. For example, the suffix relationship may not relate any suffix that is equivalent to a suffix of query word 10.

The result of attempting to modify query word 10 in accordance with suffix relationship m, however, is modified query word 32. In other words, suffix relationship m relates a suffix that is equivalent to a suffix of query word 10 to another suffix in a way that produces modified query word 32. Modified query word 32, like query word 10, is not in any of the word groups, as shown in box 34.

Similarly, the result of attempting to modify query word 10 in accordance with suffix relationship n is modified query word 36. But modified query word 36 is in one of the word groups, as shown in box 38. Unless it is necessary for some other purpose, the suffix relationships following suffix relationship n in sequence 20 need not be used in attempting to modify query word 10—a word group has been identified and can be accessed as appropriate.

In box 40 in FIG. 2, a technique determines whether a query word is in any of a number of word groups. If not, in box 42, the technique attempts to modify the query word in accordance with successive suffix relationships in a sequence. The technique continues until it obtains a modified query word that is in one of the word groups.

FIG. 3 shows processor 52 connected for obtaining query word 54 and also connected for accessing data in memory 56. Processor 52 is also connected for receiving data through data input circuitry 58, which can illustratively provide data received from connections to memory 60, storage medium access device 62, or network 64. Query word 54 could be obtained from any appropriate source, including user input circuitry (not shown), memory 56, or data input circuitry 58.

Body of data 70 illustratively provided by data input circuitry 58 includes word group data 72, suffix relationship sequence data 74, and instruction data 76. In executing the instructions indicated by instruction data 76, after loading word group data 72 and suffix relationship sequence data 74 into memory 56, processor 52 determines whether query word 54 is in any of the word groups defined by word group data 72. If not, processor 52 then attempts to modify query word 54 in accordance with successive suffix relationships in the sequence indicated by suffix relationship sequence data 74. Processor 52 continues until it obtains a modified query word that is in one of the word groups.

As noted above, FIG. 3 illustrates three possible sources from which data input circuitry 58 could provide data to processor 52—memory 60, storage medium access device 62, and network 64.

Memory 60 could be any conventional memory within machine 50, including random access memory (RAM) or read-only memory (ROM), or could be a peripheral or remote memory device of any kind.

Storage medium access device 62 could be a drive or other appropriate device or circuitry for accessing storage medium 80, which could, for example, be a magnetic medium such as a set of one or more tapes, diskettes, or floppy disks; an optical medium such as a set of one or more CD-ROMs; or any other appropriate medium for storing data. Storage medium 80 could be a part of machine 50, a part of a server or other peripheral or remote memory device, or a software product. In each of these cases, storage medium 80 is an article of manufacture that can be used in a machine.

Network 64 can provide a body of data from machine 90. Processor 92 in machine 90 can establish a connection with processor 52 over network 64 through network connection circuitry 94 and data input circuitry 58. Either processor could initiate the connection, and the connection could be established by any appropriate protocol. Then processor 92 can access a body of data stored in memory 96 and transfer the body of data to processor 52 over network 64. Processor 92 can store the body of data in memory 56 or elsewhere, and can then execute the instructions to perform lookup on the data.

FIG. 3 also illustrates that processor 52 can be connected to output device 100 for providing results, such as to a user.

C. Implementation

The general features described above could be implemented in numerous ways on various machines to identify word groups using query words. An implementation described below has been implemented on a Sun SPARC workstation running Sun OS and executing code compiled from C and Perl source code.

C. 1. Overview

Figure 4:
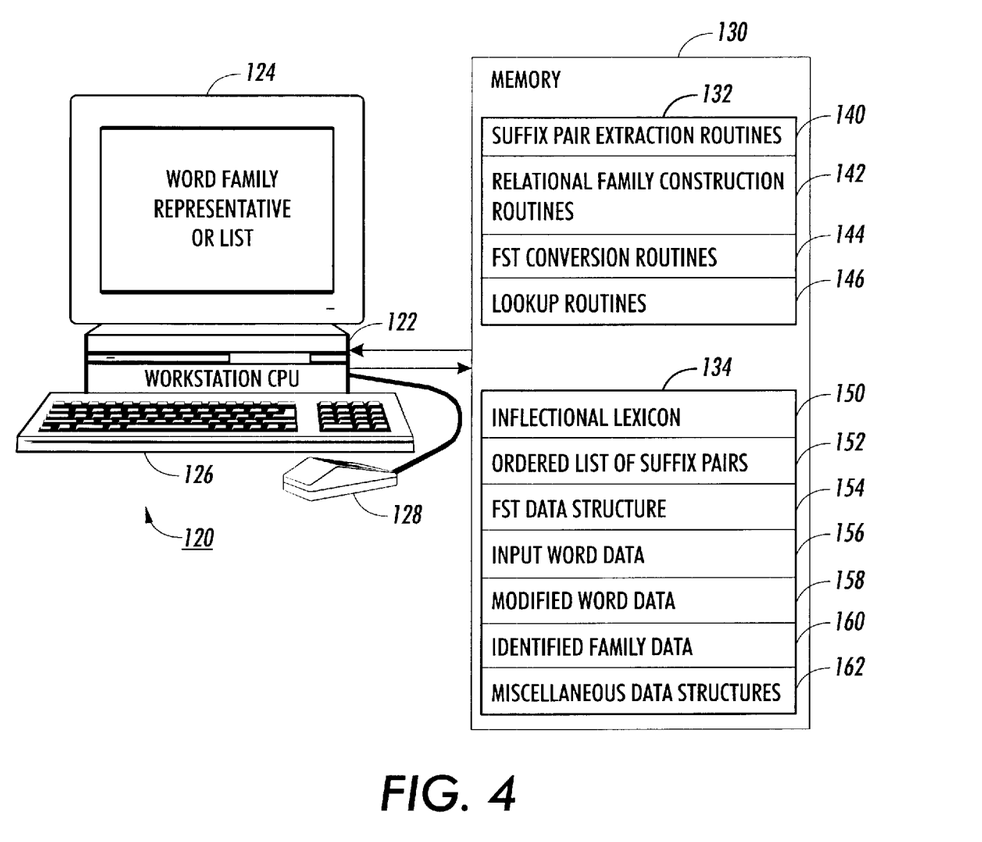
FIG. 4 is a schematic diagram of a system in which the general acts in FIG. 2 have been implemented.

In FIG. 4, system 120 includes the central processing unit (CPU) 122 of a Sun SPARC workstation, which is connected to display 124 for presenting images and to keyboard 126 and mouse 128 for providing signals from a user. CPU 122 is also connected so that it can access memory 130, which can illustratively include program memory 132 and data memory 134.

The routines stored in program memory 132 can be grouped into several functions—suffix pair extraction routines 140, relational family construction routines 142, FST conversion routines 144, and lookup routines 146. FIG. 4 also shows several data structures stored in data memory 134 and accessed by CPU 122 during execution of routines in program memory 132—inflectional lexicon 150; ordered list 152 of suffix pairs; FST data structure 154; input word data 156; modified word data 158; identified family data 160; and miscellaneous data structures 162, some of which are described below. Inflectional lexicon 150 can be any appropriate lexicon for the language in which input words will be received, such as Xerox lexicons for English or for French, both available from InXight Corporation, Palo Alto, Calif.

In executing suffix pair extraction routines 140, processor 122 can use inflectional lexicon 150 to automatically obtain ordered list 152, which lists a set of suffix pairs in the order of their frequency in lexicon 150. Ordered list 152 is therefore an implementation of suffix relationship sequence data 74 in FIG. 3. The suffix pairs can be viewed as strings for making a transition between pairs of related words, with one suffix being a string that is removed from one word in the pair to obtain a prefix and the other suffix being a string that is then added to the prefix, after any appropriate modifications in the prefix, to obtain the other word in the pair.

In executing relational family construction routines 142, processor 122 can cluster one or more sets of words using suffix pair frequencies. The result is a list of a set of word families, each of which is a subset of the clustered words. The word families obtained in this manner are referred to as "relational families" to distinguish them from conventional derivational families, which they resemble.

In executing FST conversion routines 144, processor 122 can obtain FST data structure 154 that provides an input-output pairing between each of the words in a family and a representative of the family. A family's representative could, for example, be its shortest word. FST data structure 154 can thus represent a two-level FST with a family level that accepts all the words in all of the families and with a representative level that accepts all of the representatives of families. FST data structure 154 can be accessed at the family level with a word in one of the families to read out the family's representative from the representative level. Conversely, FST data structure 154 can be accessed at the representative level with the representative of one of the families to read out all of the words in the family from the family level.

In executing lookup routines 146, processor 122 attempts to identify one of the relational families. Processor 122 may, for example, identify a family that includes the word indicated by input word data 156 or that includes one of the words indicated by modified word data 158. Each modified word is obtained from the input word using ordered list 152 of suffix pairs. Identified group data 160 can indicate, for example, the representative of the identified family or a list of the words in the identified family.

Suffix pair extraction routines 140 and lookup routines 146 can be implemented as described below. Relational family construction routines 142 and FST conversion routines 144 can be implemented as described in copending, coassigned U.S. patent application Ser. No. 09/213,309, (Attorney Docket No. R/98022), entitled "Grouping Words with Equivalent Substrings by Automatic Clustering Based on Suffix Relationships", incorporated herein by reference.

Figure 5:
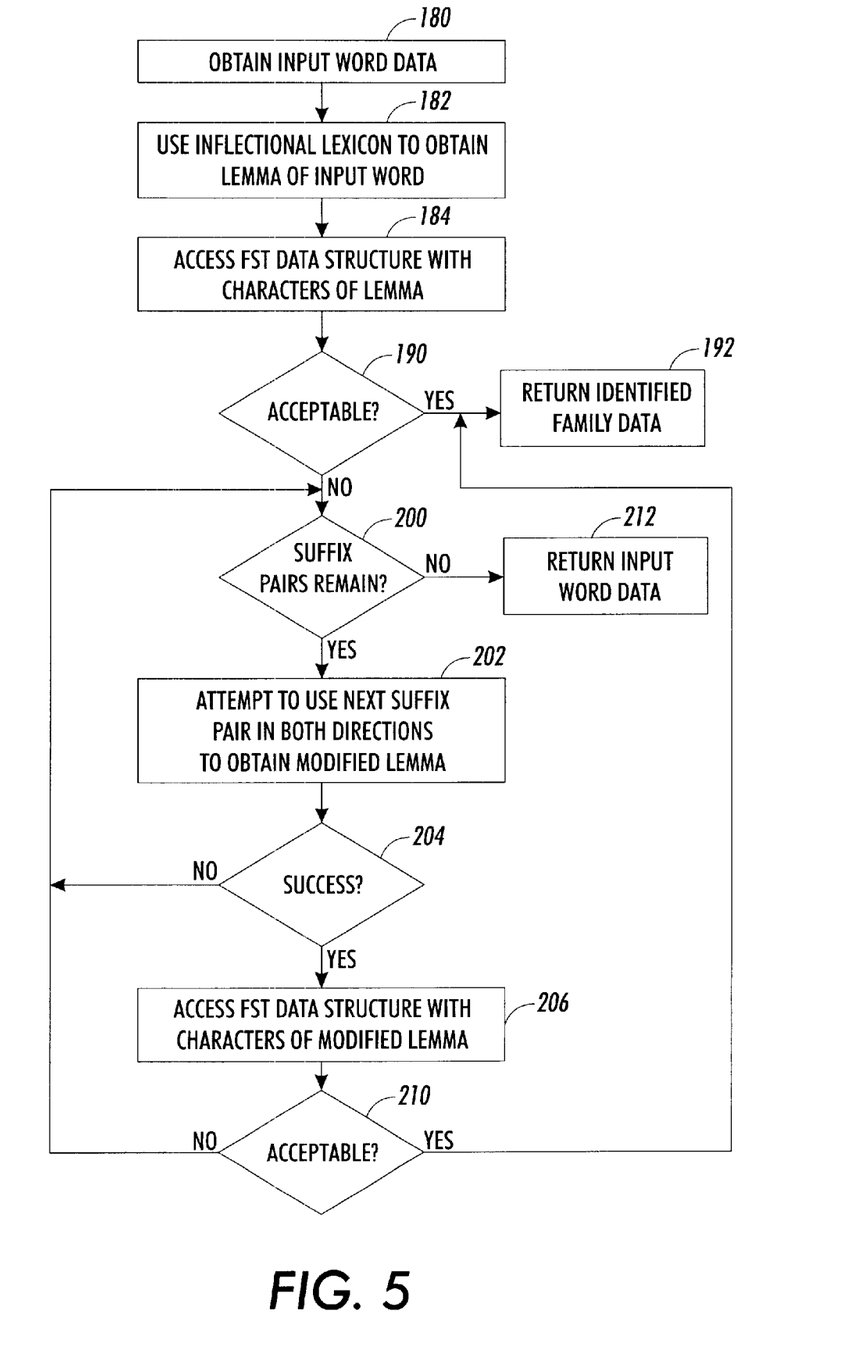
FIG. 5 is a flow chart showing how the system of FIG. 4 implements acts as in FIG. 2.

FIG. 5 illustrates general acts performed by processor 122 in executing lookup routines 146. The act in box 180 begins upon receiving input word data 156, such as in a call to lookup routines 146. In addition to being retrieved from memory 130, the input word could be received from keyboard 126 or could be indicated by a selection from mouse 128.

The act in box 182 then accesses inflectional lexicon 150, which can be implemented as an FST or in any other appropriate way, with the characters of the word indicated by input word data 156, to obtain a lemma or dictionary form and a part of speech for the input word. In some cases, the inflectional lexicon may provide more than one (lemma+part of speech) pair, in which case subsequent acts can be performed on each lemma obtained. The act in box 182 can optionally also include normalization of the lemma, which can be done in the manner described in relation to box 256 in FIG. 7 below. For convenience, each output from box 182, whether a lemma or a normalized lemma, and whether or not accompanied by data indicating a part of speech or other such indicia, is referred to below as a "lemma string" and, in FIG. 5, simply as a "lemma".

The act in box 184 then accesses FST data structure 154 with the characters of each lemma string from box 182. The act in box 184 can be implemented with conventional FST lookup techniques, such as those described in Cutting et al., U.S. Pat. No. 5,625,554, incorporated herein by reference.

The act in box 190 then branches based on whether the act in box 184 was successful in matching the characters of a lemma string with a string of characters that is acceptable at the family level of FST data structure 154. For example, if box 184 reaches a state at which none of the outgoing transitions has a family level character that matches the next lemma string character, the lemma string, and hence the input word, is not acceptable. Similarly, if box 184 is able to match all of the lemma string characters with family level characters along a path of the FST data structure, but the last transition leads to a state that cannot occur at the end of an acceptable lemma string, the lemma string, and hence the input word, is not acceptable. But if box 184 is able to match all of the lemma string characters along a path at the family level of the FST data structure, and the path leads to a state at the end of an acceptable string, the lemma string, and hence the input word, can be treated as acceptable, subject to any part-of-speech or other post-character tags that might also be matched.

The acts in boxes 184 and 186 thus implement the act in box 40 in FIG. 2, with the query word in box 40 being the lemma string obtained in box 182. In addition, the act in box 184 can save the representative level characters that are read out, thus obtaining the representative of the family that includes the lemma string, and hence includes the input word.

If a lemma string obtained in box 182 matches one of the acceptable strings of FST data structure 154, the act in box 192 obtains and returns identified family data 160. If identified family data 160 is the representative of the family that includes the lemma string, the act in box 192 can return the representative read out during the act in box 184. If identified family data 160 is a list of the words in the family, the act in box 192 can use the representative read out in box 184 to read out the words from the family level of FST data structure 154, and then return them. In either case, the information indicated by identified family data 160 can be presented on display 124 as shown in FIG. 4.

But if the lemma string does not match, the act in box 200 begins an iterative loop that goes through the suffix pairs in ordered list 152, attempting to use each of them to obtain an acceptable string. As with the lemma strings from box 182, the suffix pairs in ordered list 152 may have appended part of speech tags or the like.

The act in box 202 attempts to use the next suffix pair on ordered list 152 in both directions to obtain a modified version of the lemma string from box 182. The act in box 204 branches based on the result: If box 202 was not successful, another iteration is begun in box 200, to handle the next suffix pair on ordered list 152. But if box 202 succeeded, the modified version of the lemma string might be in one of the families.

The act in box 206 accesses FST data structure 154 with the characters of the modified version of the lemma string in the same way as in box 184, and the act in box 210 branches on the result in the same way as in box 190. If the modified version of the lemma string is an acceptable string, the act in box 192 obtains and returns identified family data 160, as described above. If not, another iteration is begun in box 200.

The acts in boxes 200, 202, 204, 206, and 210 thus implement the act in box 42 in FIG. 2, with the query word being the lemma string from box 182 as noted above. Since ordered list 152 is sorted according to frequency, the implementation in FIG. 5 continues until it reaches the most frequent suffix pair that relates the lemma string to an acceptable string.

When all the suffix pairs in ordered list 152 have been handled without obtaining a modified version of the lemma string that is acceptable, the act in box 212 returns input word data 156 received in box 180, thus indicating that the input word is not in any of the families.

C. 2. Modified Words

Figure 6:
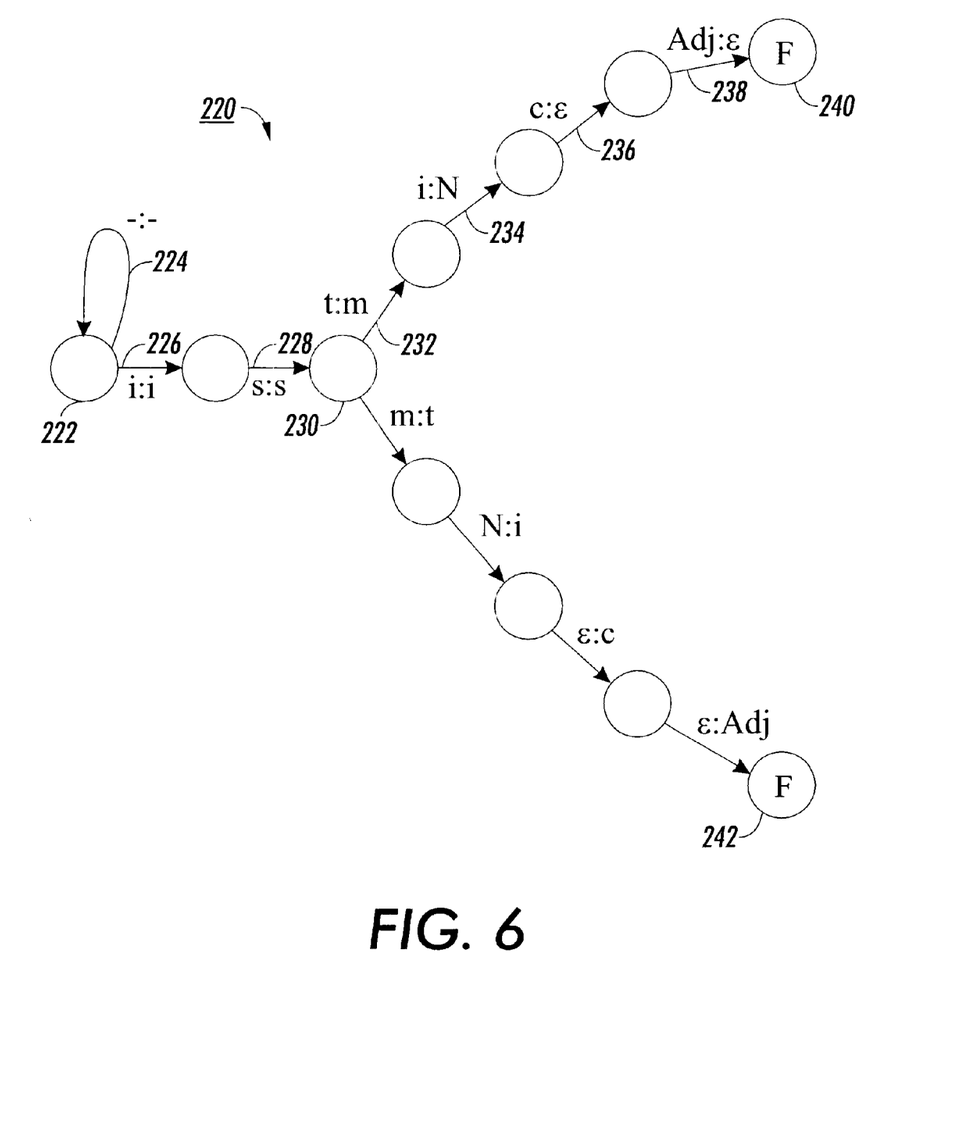
FIG. 6 is a flow chart showing additional details of how an iteration is performed in FIG. 5.

FIG. 6 illustrates an FST data structure that can be used to implement the acts in boxes 202 and 204 in FIG. 5.

FST data structure 220 has been constructed for the suffix relationship "ism+N:istic+Adj", which can take nouns with the suffix "–ism" into adjectives with the suffix "–istic" and vice versa. Examples of this relationship occur in idealism:idealistic, realism:realistic, and so forth.

Box 202 in FIG. 5 can be implemented by beginning at start state 222 and searching for a path through data structure 220 using the lemma string from box 182. Each transition in data structure 220 has two labels, referred to herein as "left label" and "right label" even though the order has no significance. The search can, for example, attempt to match the left label with an input character and take the right label as output when the left label is matched. The search can also employ an output buffer to store and modify a string of output characters and a choices stack to save choice points for use in backtracking. The search can provide the contents of the output buffer as an output string upon matching an acceptable input string of characters before doing any further backtracking.

If the lemma string from box 182 is "idealistic+Adj", for example, the search for a path can begin by attempting to follow outgoing transition 224 from start state 222. Transition 224 can be followed with any character, and provides the same character as output, so that, after transition 224 is followed for all the character in the lemma string, the output buffer will contain the lemma string "idealistic+Adj" and the choices stack will indicate that choices occurred at least at the first, sixth, and ninth characters of the input string. But start state 222 does not occur at the end of an acceptable input string, so the search must backtrack.

The search can first backtrack to the ninth character in the lemma string, leaving the output buffer containing the string "idealist". The search can then follow transition 226, which can only be followed when the next character of the input string is an "i", and which provides an "i" as output. Here again, however, the search will not succeed, because the next input character is "c", so that the search cannot follow transition 228. Therefore the search must backtrack again.

The search can next backtrack to the sixth character in the lemma string, leaving the output buffer containing the string "ideal". The search can then follow transition 226 with the "i" and transition 228 with the "s", reaching state 230 with the output buffer containing "idealis". The search can then follow the upper branch from state 230, matching the characters "t", "i", "c", and "+Adj" and obtaining "m+N" as output from transitions 232, 234, 236, and 238, because "ϵ" labels are ignored. Therefore, the buffer contains "idealism+N". In this case, state 240 occurs at the end of an acceptable input string, as indicated by the "F", so that the string "idealism+N" is output from the output buffer. Therefore, when the search is completed, the act in box 204 follows the branch to box 206, rather than returning to box 200 as it would if no output string were obtained in box 202.

Before finishing, however, the search can again backtrack to see whether there are any other output strings. The search can next backtrack to the first character of the lemma string, leaving the output buffer empty. The search can then follow transition 226 with the "i", but cannot follow transition 228 with the "d", so that no more output strings can be obtained.

Data structure 220 can conveniently go in either direction, from "–istic+Adj" to "–ism+N" as described above and also in the opposite direction, from "–ism+N" to "–istic+Adj", by following the transitions between state 230 and final state 242.

Instead of a single data structure as shown in FIG. 6, it would be possible to use two separate data structures, one to go from "–istic+Adj" to "–ism+N" and the other to go in the other direction. In this case, the act in box 204 will find success if an output is successfully obtained from either of the data structures. This may, however, be less efficient, because it would double the number of data structures.

Another approach that is within the scope of the invention is to combine a number of data structures like data structure 220 to obtain an FST data structure that defines a composite suffix relationship. This approach has been implemented by arbitrarily dividing the frequency-ordered list of pairwise suffix relationships into a relatively small number of sublists, such as five, and by then creating an FST data structure for each sublist. The five resulting FST data structures can be provided in a frequency-ordered list.

One disadvantage of arbitrarily dividing the frequency-ordered list, however, is that the resulting FSTs may provide more than one output string for some lemma strings, and the output strings for a given lemma string may not be provided in accordance with the frequency order of the pairwise suffix relationships. It may be possible to overcome this disadvantage by dividing the frequency-ordered list in a more principled way, such as by breaking it into sublists before any pairwise suffix relationship that would, when combined with the pairwise relationships since the last break, result in more than one output string for some lemma strings.

C.3. Suffix Pair Extraction

Figure 7:
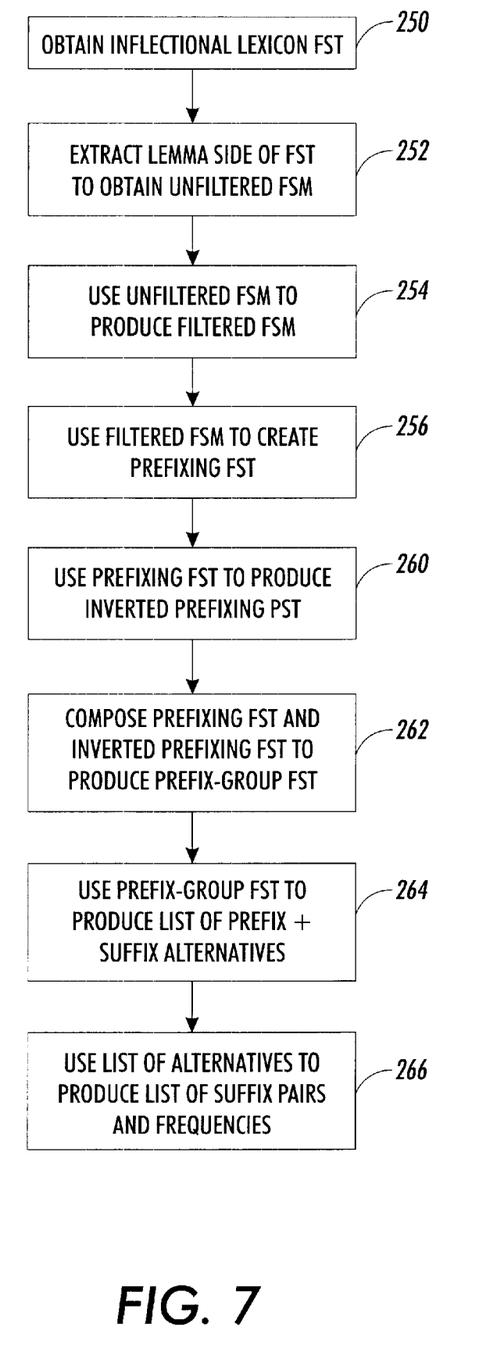
FIG. 7 is a flow chart showing how the system of FIG. 4 obtains suffix pair data.

FIG. 7 illustrates in more detail how suffix pair extraction routines 140 in FIG. 4 can be implemented.

As shown in FIG. 7, the implementation begins in box 250 by obtaining an inflectional lexicon FST data structure, such as the Xerox inflectional lexicons for English and French available from InXight Corporation of Palo Alto, Calif. These lexicons conclude each acceptable character string with a part-of-speech (POS) tag. The act in box 250 can include obtaining a handle to access a lexicon that is already stored in memory, as illustrated by inflectional lexicon 150 in FIG. 4.

The act in box 252 extracts the non-inflected or lemma side of the FST data structure to obtain an unfiltered FSM data structure that accepts all character+POS strings that are acceptable to the lemma side of the FST data structure. Because the FST data structure typically accepts an infinite set of character+POS strings, including strings of numbers, the unfiltered FSM data structure typically also accepts an infinite set, although it could be finite if the FST only accepts a finite set of character+POS strings. The act in box 252 can be implemented with a conventional automatic FSM extraction utility. Ways to implement this and related operations can be understood from U.S. Pat. No. 5,625,554 and Kaplan, R. M., and Kay, M., "Regular Models of Phonological Rule Systems", *Computational Linguistics*, Vol. 20, No. 3, 1994, pp. 331–380 ("the Kaplan and Kay article").

The act in box 254 then filters the unfiltered FSM data structure from box 252 to produce a filtered FSM data structure that accepts only suitable character+POS strings. For example, character strings can be filtered out that end with inappropriate POS tags, such as POS tags that indicate numbers of various kinds or that indicate other types of character strings that are inappropriate. In languages in which words can be created by concatenation, such as German, character strings may be filtered out that exceed a maximum appropriate length or a maximum appropriate number of concatenated parts, such as four. The act in box 254 can be implemented by composing the unfiltered FSM with a filtering FSM that defines the conditions for including a character string in the filtered FSM. The filtering FSM can be created using conventional techniques, similar to those described in U.S. Pat. No. 5,625,554 and the Kaplan and Kay article.

The act in box 256 then uses the filtered FSM data structure from box 254 to create a prefixing FST data structure that outputs a normalized prefix-equivalent in response to an acceptable word. In other words, the input level of the prefixing FST accepts all of the character+POS strings accepted by the filtered FSM, and the output level provides, for each input character+POS string, a normalized p-character string that is p/q-equivalent to a prefix of the input character+POS string for some value of q. The notion of p/q equivalence can be understood from the description in copending, coassigned U.S. patent application Ser. No. 09/213,309 (Attorney Docket No. R/98022), entitled "Grouping Words with Equivalent Substrings by Automatic Clustering Based on Suffix Relationships", incorporated herein by reference.

The act in box 256 can be implemented by creating an intermediate FST that responds to a character string by automatically normalizing characters until a string of p normalized characters is obtained; normalizing can include, for example, removing diacritical marks and possibly making replacements of characters and other modifications that produce equivalent prefixes. In the current implementation, each normalizing operation replaces a character with another character, thus maintaining one-to-one or p/p-equivalence between characters; the implementation could readily be extended to normalize a doubled character as a single character or vice versa or to make other normalizations that change the number of characters.

The intermediate FST can then be run on the word list indicated by the filtered FSM to produce a prefix FSM that indicates all the prefix-equivalents. The prefix FSM can be composed with the filtered FSM to produce the prefixing FST. In the prefixing FST, the (p+1)th and following characters along each path at the input level are paired with an epsilon at the output level, meaning that no output is provided in response to those characters.

The act in box 260 inverts the prefixing FST from box 256 to produce an inverted prefixing FST with prefix equivalents at the input level and with acceptable words at the output level. The act in box 260 can be implemented by simply switching the elements in the label of each transition in the FST. The act in box 262 composes the prefixing FST from box 256 with the inverted prefixing FST from box 260, performing the composition so that the prefix-equivalents drop out and so that epsilons are added to lengthen the shorter of an input character+POS string to equal an output character+POS string, producing a prefix-group FST. The prefix-group FST accepts the word list of the filtered FSM from box 254 at its input level and can output every word that had the same prefix-equivalent in the prefixing FST from box 256. The composition in box 262 can be performed with conventional techniques similar to those described in U.S. Pat. No. 5,625,554 and the Kaplan and Kay article.

The act in box 264 then uses the prefix-group FST from box 262 to produce a list of prefix+suffix alternatives. The act in box 264 can be implemented by reading out the character pairs along each path of the prefix-group FST and comparing the characters in each pair until a mismatch is found. Before finding a mismatch, only one character is saved for the prefix, but after a mismatch is found, both characters of each pair are saved for the suffix.

For example, for the path that relates the verb "produce" to the noun "production", the prefix+suffix alternatives could be represented by the following string: (p, r, o, d, u, c, <e:t>, <+V:i>, <$\epsilon$:o>, <$\epsilon$:n>, <$\epsilon$:+N>), where "$\epsilon$" characters have been included to compensate for the difference in length, and where "+V" and "+N" indicate a verb and a noun, respectively. The prefix of the path is thus "produc", and the path has two alternative suffixes, "e+V" and "tion+N".

The act in box 266 can then use the list produced in box 264 to produce a list of suffix pairs and frequencies. This list can be produced by converting the suffix alternatives of each item on the list from box 264 to a suffix pair. If the suffix pair matches a suffix pair on a list of previously obtained suffix pairs, the act in box 266 increments its frequency; if not, the suffix pair is added to the list with a frequency of one. After all items on the list from box 264 have been handled, the act in box 266 sorts the list by frequency to obtain ordered list 152 of suffix pairs, each of which can then be converted into an FST of the type shown in FIG. 6 using conventional techniques. The suffix pair FSTs can be used as described above in relation to boxes 202 and 204 of FIG. 5.

C.4. Variations

The implementation described above could be varied in many ways within the scope of the invention.

The implementation described above has been successfully executed on Sun SPARC workstations, but implementations could be executed on other machines.

The implementation described above has been successfully executed using the C programming environment on the Sun OS platform, but other programming environments and platforms could be used.

The implementation described above attempts modifications in accordance with a sequence of suffix relationships indicated by an ordered list of suffix pairs, sorted according to frequency. The invention could be implemented to attempt modifications in accordance with a sequence indicated or obtained in any other way, such as from a relational database or from a list of words using Unix tools like findaffix, and the list of suffix pairs could be ordered in any other appropriate way, based for example on the probability of co-occurrence in a corpus of the language under consideration. Further, a suffix relationship could relate more than two suffixes. As explained above in relation to FIG. 6, it may be beneficial to implement the invention with several composite suffix relationships, each of which is defined by an FST that incorporates a number of pairwise suffix relationships.

The implementation described above can obtain, for a given query word, only one modified word that is in one of the word groups, but the invention could also be implemented to continue to attempt modifications after obtaining one modified word that is in one of the word groups.

The implementation described above uses a language's inflectional lexicon to obtain suffix pairs, but other information about a language could be used to obtain suffix pairs, such as a list or other data structure indicating words that are acceptable in the language, and suffix pairs could be obtained in a wide variety of ways, including from a list of words using Unix tools like findaffix. The implementation also uses the inflectional lexicon to obtain lemmas of input words, but the invention could be implemented by using input words directly rather than obtaining lemmas or with stemming or other operations to obtain uninflected forms of words. Furthermore, the implementation described above could be used in combination with other techniques for identifying a group of words that include or relate to an input word.

The implementation described above uses an FST data structure to identify a group of families that includes a word, but groups of words could be stored in many other types of data structures in addition to an FST, such as in relational databases, and a group could accordingly be identified in any way appropriate to such other types of data structures.

The implementation described above uses an FST that maps from a word to a representative of a relational family, which is similar to a derivational family. An FST could, however, map to any other appropriate information identifying a group that includes a word, and the groups need not be relational families, but could be other types of families or groups within which related words have related suffixes, such as inflectional families.

The implementation described above includes part of speech in each suffix pair, but this is optional. The invention could be implemented without taking part of speech into account.

The implementation described above has been applied to English and French, but the invention can be applied to languages other than English and French.

In the implementation described above, acts are performed in an order that could be modified in many cases.

The implementation described above uses currently available computing techniques, but could readily be modified to use newly discovered computing techniques as they become available.

D. Applications

The invention can be applied to automatically obtain a group of words that include or relate to an input word, and the group of words can then be used in formulating an information retrieval query. To improve information retrieval performance, this can be done for each word in a query.

E. Miscellaneous

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of using a query word to identify one of a number of word groups; the method comprising:
    (A) determining whether the query word is in any of the word groups; and
    (B) if the query word is not in any of the word groups, attempting to modify the query word in accordance with successive suffix relationships by changing a suffix in a sequence until a modified query word is obtained that is in one of the word groups, wherein the successive suffix relationships are ordered in a list according to their frequencies of occurrence in a natural language so as to attempt to modify the query word first in accordance with a suffix relationship that has the highest frequency of occurrence in the natural language.

2. The method of claim 1 in which the sequence of suffix relationships is defined by an ordered list of the suffix relationships and in which (B) comprises:
    attempting to modify the query word in accordance with each relationship in the ordered list of suffix relationships until a modified query word is obtained that is in one of the groups.

3. The method of claim 2 in which the suffix relationships are pairwise relationships.

4. The method of claim 3 in which (B) further comprises attempting to modify the query word by following each pairwise relationship in both directions.

5. The method of claim 2 in which the suffix relationships are ordered in the list according to their frequencies of occurrence in a natural language and in which (B) further comprises:
    attempting to modify the query word first in accordance with the suffix relationship that has the highest frequency of occurrence in the natural language.

6. The method of claim 2, further comprising, prior to (A): automatically producing a word group data structure that indicates the word groups; the ordered list of suffix relationships being automatically obtained in producing the word group data structure.

7. The method of claim 1 in which (B) comprises a series of iterations, each for one of the suffix relationships in the sequence; each iteration comprising:
    (B1) attempting to modify the query word in accordance with the iteration's suffix relationship; and
    (B2) if (B1) successfully modifies the query word to obtain a modified query word, determining whether the modified query word is in any of the word groups.

8. The method of claim 1, further comprising:
    (C) upon obtaining a modified query word that is in one of the word groups, providing information identifying the word group.

9. The method of claim 8 in which each of the word groups has a representative and in which (C) returns the representative of the word group.

10. The method of claim 8 in which (C) returns a list of words in the word group.

11. A system for using a query word to identify one of a number of word groups, comprising:
    a query word; and
    a processor; the processor operating to:
        determine whether the query word is in any of the word groups; and
        if not, attempt to modify the query word in accordance with successive suffix relationships by changing a suffix in a sequence until a modified query word is obtained that is in one of the word groups, wherein the successive suffix relationships are ordered in a list according to their frequencies of occurrence in a natural language so as to attempt to modify the query word first in accordance with a suffix relationship that has the highest frequency of occurrence in the natural language.

12. The system of claim 11, further comprising:

stored word group data indicating the word groups; the processor, upon obtaining a modified query word, operating to access the stored word group data to determine whether the modified query word is in one of the word groups.

13. The system of claim 12 in which the word group data are an FST data structure.

14. The system of claim 11, further comprising:

stored suffix relationship sequence data indicating the sequence of suffix relationships; the processor, in attempting to modify the query word, operating to access the suffix relationship sequence data to obtain a next suffix relationship.

15. An article of manufacture for use in a system for using a query word to identify one of a number of word group; the system including:

the query word;

a storage medium access device; and a processor connected for receiving data accessed on a storage medium by the storage medium access device;

the article of manufacture comprising:
a storage medium; and
instruction data stored by the storage medium; the instruction data indicating instructions the processor can execute; the processor, in executing the instructions:
determining whether the query word is in any of the word groups; and
if not, attempting to modify the query word in accordance with successive suffix relationships by changing a suffix in a sequence until a modified query word is obtained that is in one of the word groups, wherein the successive suffix relationships are ordered in a list according to their frequencies of occurrence in a natural language so as to attempt to modify the query word first in accordance with a suffix relationship that has the highest frequency of occurrence in the natural language.

16. The article of claim 15, further comprising:

word group data indicating the word groups; the processor, in executing the instructions, further:
upon obtaining a modified query word, operating to access the stored word group data to determine whether the modified query word is in one of the word groups.

17. The article of claim 16 in which the word group data are an FST data structure.

18. The article of claim 15, further comprising:

suffix relationship sequence data stored by the storage medium; the suffix relationship sequence data indicating the sequence of suffix relationships;

the processor, in executing the instructions, further:
in attempting to modify the query word, operating to access the suffix relationship sequence data to obtain a next suffix relationship.

19. A method of operating a first machine to transfer data to a second machine over a network, the second machine including a memory and a processor connected for accessing the memory; the memory being for storing instruction data; the method comprising:

establishing a connection between the first and second machines over the network; and operating the first machine to transfer instruction data to the memory of the second machine; the instruction data indicating instructions the processor can execute; the processor, in executing the instructions, using a query word to identify one of a number of word groups; the processor operating to:
determine whether the query word is in any of the word groups; and
if not, attempt to modify the query word in accordance with successive suffix relationships by changing a suffix in a sequence until a modified query word is obtained that is in one of the word groups, wherein the successive suffix relationships are ordered in a list according to their frequencies of occurrence in a natural language so as to attempt to modify the query word first in accordance with a suffix relationship that has the highest frequency of occurrence in the natural language.

20. A method of using a query word to identify one of a number of word group; the method comprising:

(A) determining whether the query word is in any of the word groups; and (B) if the query word is not in any of the word group, attempting to modify the query word in accordance with each suffix relationship in an ordered list of suffix relationship until a modified query word is obtained that is in one of the group, wherein the suffix relationships are ordered in a list according to their frequencies of occurrence in a natural language so as to modify the query word first in accordance with the suffix relationship that has the highest frequency of occurrence in the language.

* * * * *